(12) United States Patent
Schmidt et al.

(10) Patent No.: US 7,735,871 B2
(45) Date of Patent: Jun. 15, 2010

(54) SEAT BELT RETRACTOR AND PRETENSIONER COMBINATION

(75) Inventors: Martin Schmidt, Elmshorn (DE);
Stefan Bösch, Hamburg (DE); Thomas Schneider, Husum (DE); Stefan Suhr, Elmshorn (DE); Erne Frey, Elmshorn (DE)

(73) Assignee: Autoliv Development AB, Vargarda (SE)

( * ) Notice: Subject to any disclaimer, the term of this patent is extended or adjusted under 35 U.S.C. 154(b) by 725 days.

(21) Appl. No.: 10/581,820

(22) PCT Filed: Nov. 30, 2004

(86) PCT No.: PCT/EP2004/013562

§ 371 (c)(1),
(2), (4) Date: Mar. 7, 2007

(87) PCT Pub. No.: WO2005/054016

PCT Pub. Date: Jun. 16, 2005

(65) Prior Publication Data

US 2007/0272786 A1    Nov. 29, 2007

(30) Foreign Application Priority Data

Dec. 2, 2003   (DE) .............................. 103 56 206

(51) Int. Cl.
*B60R 22/34* (2006.01)
(52) U.S. Cl. .................... 280/807; 242/374
(58) Field of Classification Search ................. 242/374; 297/475, 478; 280/806, 807; 60/632
See application file for complete search history.

(56) References Cited

U.S. PATENT DOCUMENTS

| | | | | |
|---|---|---|---|---|
| 4,444,010 A | * | 4/1984 | Bendler | 60/407 |
| 5,690,295 A | * | 11/1997 | Steinberg et al. | 242/374 |
| 5,699,976 A | * | 12/1997 | Hori | 242/374 |
| 5,881,962 A | | 3/1999 | Schmidt et al. | |
| 5,924,640 A | * | 7/1999 | Hickey | 242/374 |
| 6,419,176 B1 | * | 7/2002 | Mizuno | 242/374 |
| 6,669,131 B2 | * | 12/2003 | Takehara et al. | 242/374 |
| 2005/0178870 A1 | | 8/2005 | Loffler et al. | |

FOREIGN PATENT DOCUMENTS

| | | |
|---|---|---|
| DE | 195 12 660 A1 | 10/1995 |
| DE | 696 03 158 T2 | 3/2000 |
| DE | 102 13 906 A1 | 10/2003 |

* cited by examiner

*Primary Examiner*—Paul N Dickson
*Assistant Examiner*—Robert A Coker
(74) *Attorney, Agent, or Firm*—Brinks Hofer Gilson & Lione

(57) ABSTRACT

The invention relates to a seat belt retractor including a pretensioner especially for use in motor vehicles. The seat belt retractor includes a spool belt which supports belt webbing of the seat belt and rotates in the take-up direction of the safety belt when the pretensioning drive coupled to the belt spool is activated. The belt spool is associated with a drivewheel with recesses on the periphery thereof for accepting mass bodies acting as drive means for pretensioning the seat belt. The mass bodies are stored in a tube, which tangentially flows into the drivewheel, and the mass bodies are accelerated in the tube by means of a gas generator arranged at one end of the tube.

6 Claims, 2 Drawing Sheets

SEAT BELT RETRACTOR AND PRETENSIONER COMBINATION

CROSS REFERENCE TO RELATED APPLICATIONS

This application claims priority to PCT/EP2004/013562, filed Nov. 30, 2004 and to DE 103 56 206.0 filed Dec. 2, 2003.

BACKGROUND

1. Field of the Invention

The invention relates to a rotating retractor and pretensioner for a safety belt, especially in motor vehicles. The invention includes a belt retractor, the belt shaft of which supports the belt winding and rotates in the take-up direction of the safety belt when the tensioning drive coupled to the belt shaft is released. The belt shaft is associated with a drivewheel with recesses on the periphery thereof for accepting mass bodies acting as drive means, and the mass bodies are stored in a tube, which tangentially flows into the drivewheel, and the mass bodies are accelerated in the tube by means of a gas generator arranged at one end of the tube.

2. Description of Related Art

A rotating retractor and pretensioner having the above features is described in U.S. Pat. No. 5,881,962. A belt spool of the associated rotating retractor is mounted between the sides of a U-shaped housing, a drivewheel is arranged on an end of the belt shaft protruding over the associated housing arms, the periphery of the drivewheel is provided with dome-shaped recesses for accepting mass spheres as drive means for the drivewheel. In the plane of the drivewheel, a tube, which forms a channel and which preferably has a pyrotechnical drive unit on its end, is fastened to the housing arm, a number of mass spheres being stored in the tube. The channel surrounds the drivewheel in a spiral shape directed from outside to inside in such a manner that the channel flows tangentially into the drivewheel. The channel surrounds the drivewheel and its dome-shaped recesses over part of the drivewheel's periphery and flows into a planar displaced outlet through which the mass spheres conducted into the channel via the drivewheel leave the channel, the belt retractor being provided with an appropriately arranged receptacle for this purpose.

The known rotating pretensioner has the disadvantage that the arrangement of the tube with the channel for accepting mass spheres causes a corresponding space requirement on one side of the belt roller housing, particularly since the arrangement of tube surrounding the drivewheel clearly exceeds the dimensions of the belt roller housing. It is therefore not possible to mount the belt retractor and pretensioner combination in every position in a motor vehicle. Since the receptacle has to be arranged planar-displaced because the tube surrounding the drivewheel within one plane, the belt retractor and pretensioner combination likewise has a correspondingly large overall axial width. Moreover, the one-sided arrangement of the tube also causes a non-uniform weight distribution, potentially causing assembly problems. The continuous bending of the tube to the spiral shape of the channel is expensive to produce and difficult to mount on the belt roller housing.

The object of the invention is therefore to simplify the production and assembly of a tube accepting the mass bodies in a rotating pretensioner having generic features and to permit a more compact construction of the belt retractor and pretensioner combination.

The solution to this problem, including advantageous embodiments and further developments of the invention, follows for the content of the claims, which follow this description.

SUMMARY

The basic concept of the present invention provides a arranged with at least one straight section in a parallel direction to the belt spool, between opposing housing sides of the U-shaped belt retractor housing and extends with an end section running in the plane of the drivewheel in a tangential direction to the drivewheel. The invention has the advantage that, because of the displacement of the tube from the outside of the one housing arm into the space between the two housing arms, the space requirement for this arrangement of the pretensioner is significantly reduced resulting in a more compact construction of the belt retractor and pretensioner combination. In this case, it is particularly advantageous that the tube is arranged within the dimensions of the belt retractor housing and inside the outside contour, so that no parts of the pretensioner unit still project over the contour of the belt roller housing. The tube itself with the essentially straight sections is simpler to produce and to mount, and finally, it is also possible to arrange the receptacle in the plane of the drivewheel because this plane is free of other built-in components of the tube with the exception of the end section that runs tangentially.

According to one exemplary embodiment of the present invention, it is provided that the tube for a belt retractor housing with a rectangular cross section is arranged in an outer corner region of the belt retractor housing, and the end section of the tube is bent off from the straight section located between the housing arms and guided to the drivewheel. A tubing running between the opposing housing arms of the belt roller housing thus suffices in the simplest form of the invention.

If a larger number of mass spheres must be accommodated in view of a longer path in the tube, then it is provided in another exemplary embodiment of the invention that the tube is U-shaped comprising two straight sections located between the opposing housing arms of the belt retractor housing and one bent section running in the plane of the housing side opposite the drivewheel arrangement. For reasons of compact construction, it is provided that the two straight sections of the tube are each arranged in two adjacent outer corner regions of the belt roller housing.

In view of the arrangement of the receptacle, it is provided that a receptacle for accepting the mass bodies passing through and exiting the drivewheel is arranged between the opposing straight sections of the tube.

If, in order to ensure a trouble-free rotation of the drivewheel, it is necessary to feed into the recesses of the drivewheel the mass bodies that are driven through the tubular end section of the tube that runs in a tangential direction to the drivewheel, then it is provided in another exemplary embodiment that a feeding element that feeds the mass bodes into the recesses of the drivewheel is arranged on the open end of the tubular end section.

In an alternative embodiment, it can be provided that the tubular end section running in a tangential direction to the drivewheel includes a deformation introduced into the wall of the end section. The deformation is configured with such a radius that the mass bodies that are driven through the end section and run across the wall of the end section via the deformation are fed into the recesses of the drivewheel. This has the advantage that a particular component for driving the mass bodies into the drivewheel can be dispensed with and a simple and cost-effective assembly of the rotating pretensioner results.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The drawing reflects exemplary embodiments of the invention which will be described below.

DETAILED DESCRIPTION

Figure 1:
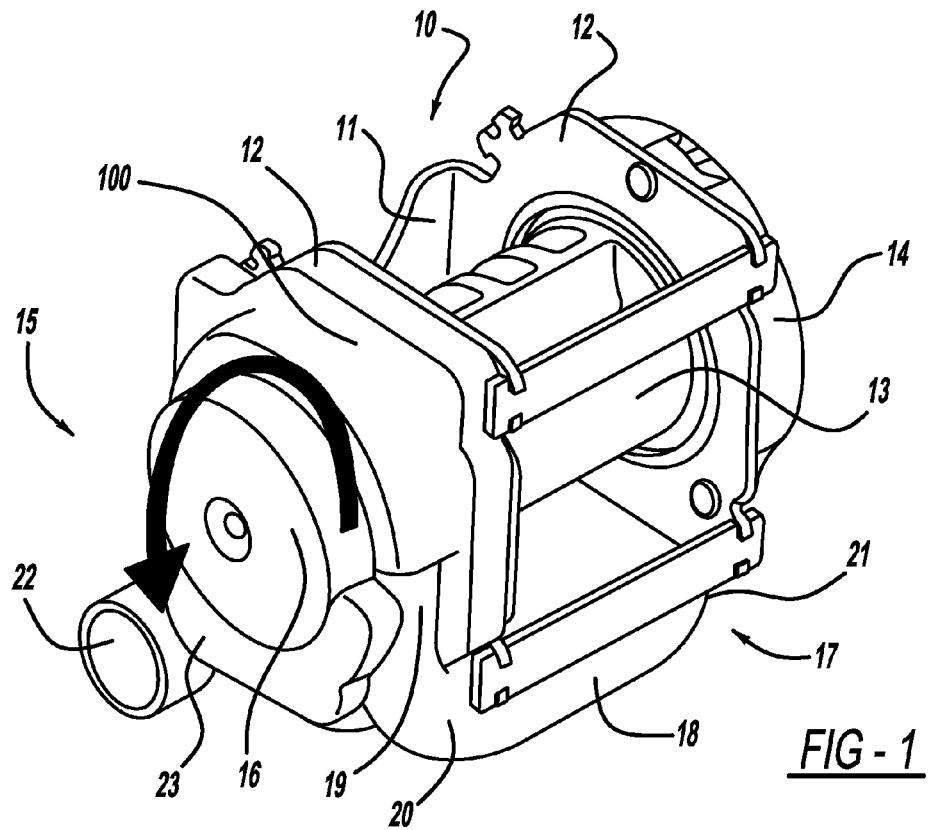
FIG. 1 shows a belt retractor and pretensioner combination in a perspective view.

The belt retractor 10 and pretensioner unit depicted in FIG. 1 includes a U-shaped belt retractor housing 11 and opposing housing sides 12, whereby the belt spool 13 is mounted in the housing arms 12. A sensing unit 14, which can comprise a seatbelt-sensitive and/or vehicle-sensitive locking unit for the belt shaft and the associated take-up spring, is arranged on the outside of the associated housing side 12 on one end of a belt spool 13 on the right end in the illustration of FIG. 1.

The drive side 15 of the associated retractor unit 10, includes a drivewheel 16 coupled to the projecting end of the belt spool 13 through the associated housing side 12 and is located opposite the sensing unit 14. The configuration and function of the drivewheel in cooperation with mass spheres 25 (see FIG. 2) serve as a drive means for pretensioning the seat belt, and is thoroughly presented in U.S. Pat. No. 5,881, 962, which is herein incorporated by reference.

The mass spheres 25 are fed by a tube 17 arranged on the belt roller housing 11. The tube 17 first of all forms a straight section 18 running parallel to the belt spool 13 and between the opposing housing sides 12 of the belt retractor housing 11. This straight section 18 transitions, by means of an appropriate bend 20, into an end section 19, which is arranged on the outside of the associated housing side 12 and runs tangentially into the drivewheel 16.

Figure 2:
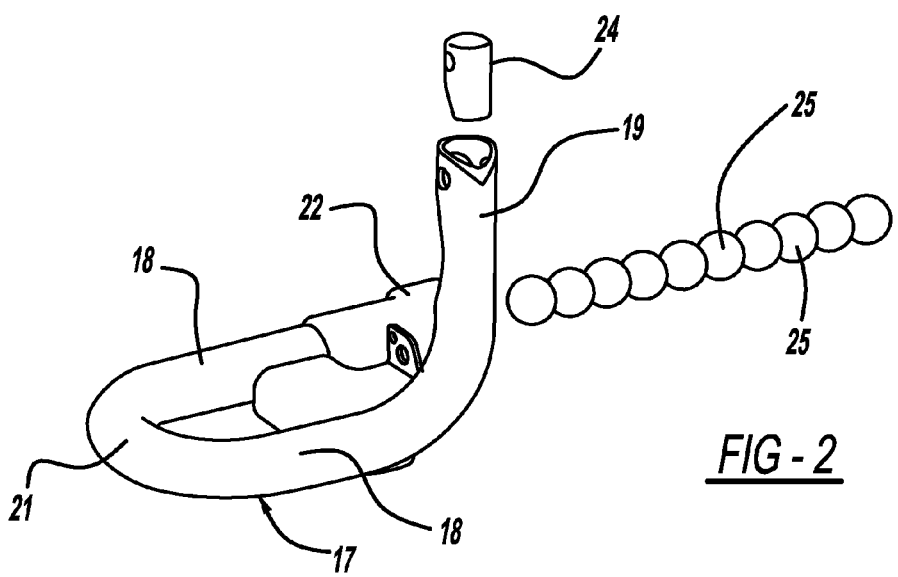
FIG. 2 shows an associated tube and the mass spheres of the belt retractor and pretensioner combination of FIG. 1.

As indicated in FIG. 1, but more clearly presented in FIG. 2 in another exemplary embodiment, the tube 17 has a U-shaped configuration including a first straight section 18 (illustrated in FIG. 1), a second straight section 18 on the opposite side of the belt retractor housing 11, and a gas generator 22 located on the end of the second straight section. A bent section 21, which runs in the vicinity of the housing side 12 opposite the drive side 15, connects the two straight sections 18 of the tube 17 together. The tube 17 may have any appropriate cross-section, for example, circular, rectangular or square.

Since the plane of the drivewheel 16 is free of other built-in components, with the exception of the end section 19, a receptacle 23 which receives the mass spheres after they have passed though the drivewheel 16, is arranged between the opposing straight sections 18 of the tube 17.

The tube 17 flows into the drivewheel 16 tangentially. In the further course of movement of the mass spheres, a pretensioner channel is formed directly by the drivewheel 16 and a housing 100 enclosing the drivewheel 16. The mass spheres 25 are guided around a peripheral section of at least 160 degrees to 210 degrees around the drivewheel 16. This is particularly advantageous when a configuration of the pretensioner is provided according to U.S. Patent Publication No. 2005/0178870 A1 which is incorporated by reference. In this pretensioner, the drivewheel 16 is disconnected from the drive force during force limitation by fixing the drivewheel 16 following the coupling step, so that the mass spheres 25 can remain in the drivewheel without disturbing the force limitation. The required receptacle can therefore be dimensioned much smaller.

An Alternate representation of the tube 17 can be found in FIG. 2. In this embodiment, a feeding element 24 is illustrated pushed into the end of the end section 19 and takes care of feeding the mass spheres 25 through the tube 17.

Figure 3:
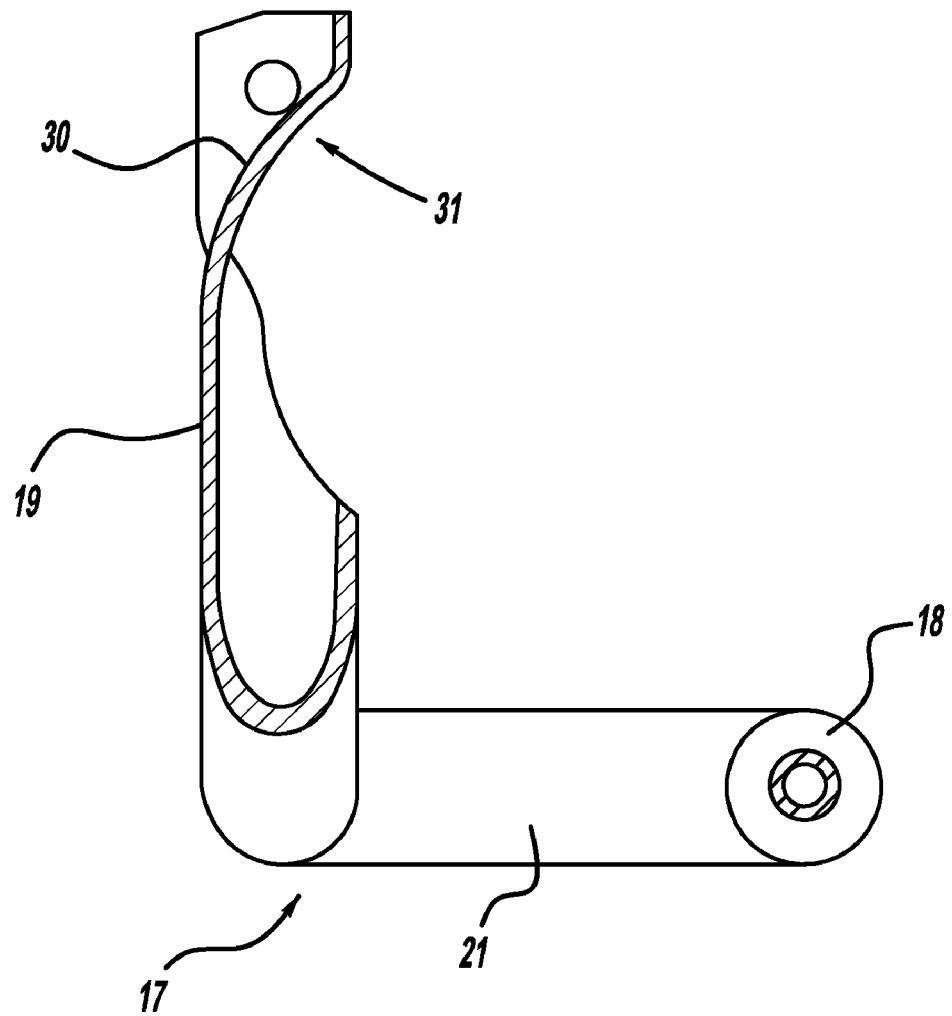
FIG. 3 shows the tube according to FIG. 2 in another embodiment.

In regard to feeding the mass spheres 25 into the associated recesses of the drivewheel 16, according to the embodiment illustrated in FIG. 3, a deformation 31 is introduced into the wall 30 of end section 19 in place of the feeding element 24 shown in FIG. 2. The deformation 31 is configured with such a radius that the mass spheres 25 are driven through the end section 19 and run across the wall 30 of the end section 19 via the deformation 31 and are fed into the recesses of the drivewheel 16.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A seat belt retractor for a seat belt including a pretensioner, especially for use in motor vehicles, comprising: a belt retractor housing, a belt spool rotatably mounted to the housing and attached to a safety belt, the belt spool being configured to rotate in a retraction direction of the safety belt when a gas generator, coupled to the belt spool by a tube, is activated, wherein the belt spool is attached to a drivewheel with recesses on the periphery thereof for accepting mass bodies configured as a drive means for pretentioning the safety belt, the mass bodies being stored in the tube and arranged to tangentially flow into the drivewheel, the mass bodies being accelerated in the tube by means of the gas generator arranged at one end of the tube, and the tube includes at least one straight section that stores at least a portion of the mass bodies, the at least one straight section extending in a parallel direction to an axis of rotation of the belt spool between opposing housing sides of the belt retractor housing, and further including an end section running in a plane of the drivewheel and wherein the tube is configured in a U-shape comprising two straight sections located between the opposing housing sides of the belt retractor housing with one bent section running in the plane of the housing side that is opposite the drivewheel.

2. A seat belt retractor according to claim 1, wherein the tube for the belt retractor housing includes one of a circular, a square and a rectangular cross section and is arranged in an outer corner of the belt retractor housing, the end section of the tube being attached by a bend to the straight section between the housing sides and guided to the drivewheel.

3. A seat belt retractor according to claim 1, wherein the two straight sections of the tube are arranged in two adjacent outer corner regions of the belt retractor housing.

4. A seat belt retractor according to claim 1, wherein a receptacle for accepting the mass bodies passing through and exiting the drivewheel is arranged between opposing straight sections of the tube.

5. A seat belt retractor according to claim 1, wherein a feeding element configured to feed the mass bodies into the recesses of the drivewheel through the end section of the tube is arranged on the open end of the end section in a tangential direction to the drivewheel.

6. A seat belt retractor according to claim 1, wherein the end section running in a tangential direction to the drivewheel includes a deformation in a wall of the end section, the deformation being configured with a radius such that the mass bodies are driven through the end section and run across the wall of the end section via the deformation and are fed into the recesses of the drivewheel.

* * * * *